US012777237B2

(12) United States Patent
Chun et al.

(10) Patent No.: US 12,777,237 B2
(45) Date of Patent: Oct. 27, 2026

(54) CAMERA MODULE WITH LENS DRIVER

(71) Applicant: SAMSUNG ELECTRO-MECHANICS CO., LTD., Suwon-si (KR)

(72) Inventors: Jibuem Chun, Suwon-si (KR); Namki Park, Suwon-si (KR); Hongjoo Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 287 days.

(21) Appl. No.: 18/351,701

(22) Filed: Jul. 13, 2023

(65) Prior Publication Data

US 2024/0276087 A1 Aug. 15, 2024

(30) Foreign Application Priority Data

Feb. 9, 2023 (KR) ........................ 10-2023-0017564

(51) Int. Cl.
*H04N 23/54* (2023.01)
*G02B 7/02* (2021.01)
(Continued)

(52) U.S. Cl.
CPC ............. *H04N 23/54* (2023.01); *G02B 7/021* (2013.01); *G02B 7/08* (2013.01); *H02K 41/0356* (2013.01); *H04N 23/687* (2023.01)

(58) Field of Classification Search
CPC ...... H04N 23/54; H04N 23/687; H04N 23/00; H04N 23/55; H04N 23/57; G02B 7/021;
(Continued)

(56) References Cited

U.S. PATENT DOCUMENTS

| | | | | |
|---|---|---|---|---|
| 2017/0160558 | A1 | 6/2017 | Kim et al. | |
| 2018/0224631 | A1* | 8/2018 | Ichihashi | H01H 47/22 |

(Continued)

FOREIGN PATENT DOCUMENTS

| | | | |
|---|---|---|---|
| JP | 7190604 | B1 | 12/2022 |
| KR | 10-2014-0142189 | A | 12/2014 |

(Continued)

OTHER PUBLICATIONS

Lens Driving Device, Camera Module, and Optical Device (Year: 2022).*

(Continued)

*Primary Examiner* — Twyler L Haskins
*Assistant Examiner* — Surafel Yilmakassaye
(74) *Attorney, Agent, or Firm* — NSIP Law

(57) ABSTRACT

A lens driver includes a plurality of first coils disposed on a first substrate extending in a first direction, a second coil disposed on a second substrate extending in a second direction different from the first direction, a first sensing portion disposed on the first substrate, and disposed external to the plurality of first coils so as to not overlap the plurality of first coils along the second direction, a first magnet including a first and second magnet portions that respectively face at least one of the plurality of first coils along the second direction, with different magnetic poles along the first direction, and a second magnet facing the first sensing portion along the second direction, wherein a second distance between the first substrate and the second magnet along the second direction is greater than a first distance between the first substrate and the first magnet along the second direction.

20 Claims, 6 Drawing Sheets

(51) Int. Cl.
*G02B 7/08* (2021.01)
*H02K 41/035* (2006.01)
*H04N 23/68* (2023.01)

(58) Field of Classification Search
CPC . G02B 7/08; G02B 7/09; G02B 7/023; G02B 27/646; H02K 41/0356; G03B 5/00; G03B 30/00; G03B 3/10; G03B 13/36; G03B 17/12; G03B 2205/0007; G03B 2205/0046; G03B 2205/0069
See application file for complete search history.

(56) References Cited

U.S. PATENT DOCUMENTS

| | | | | |
|---|---|---|---|---|
| 2018/0284568 | A1 | 10/2018 | Oh et al. | |
| 2019/0294027 | A1* | 9/2019 | Kim | G03B 5/00 |
| 2020/0137274 | A1* | 4/2020 | Lee | G03B 17/17 |
| 2021/0048729 | A1 | 2/2021 | Yoon et al. | |
| 2021/0289111 | A1 | 9/2021 | Lim et al. | |
| 2022/0360200 | A1* | 11/2022 | I | G02B 27/646 |
| 2023/0388619 | A1 | 11/2023 | Yokobori et al. | |

FOREIGN PATENT DOCUMENTS

| | | | | |
|---|---|---|---|---|
| KR | 10-2016-0005956 | A | 1/2016 | |
| KR | 10-2017-0001988 | A | 1/2017 | |
| KR | 10-2018-0112689 | A | 10/2018 | |
| KR | 10-2019-0061439 | A | 6/2019 | |
| KR | 10-2019-0119856 | A | 10/2019 | |
| KR | 10-2021-0020728 | A | 2/2021 | |
| KR | 10-2021-0115420 | A | 9/2021 | |
| KR | 10-2022-0152381 | A | 11/2022 | |
| WO | WO-2022055075 | A1 * | 3/2022 | G03B 30/00 |

OTHER PUBLICATIONS

Korean Office Action issued on Mar. 24, 2025, in corresponding Korean Patent Application No. 10-2023-0017564. (4pages in English, 4pages in Korean).

Korean Office Action Issued on Nov. 5, 2025, in Counterpart Korean Patent Application No. 10-2023-0017564 (1 Page in English, 2 Pages in Korean).

* cited by examiner

CAMERA MODULE WITH LENS DRIVER

CROSS-REFERENCE TO RELATED APPLICATION

This application claims the benefit under 35 USC § 119(a) of Korean Patent Application No. 10-2023-0017564 filed on Feb. 9, 2023, in the Korean Intellectual Property Office, the entire contents of which are incorporated herein by reference for all purposes.

BACKGROUND

1. Field

The following description relates to a lens driver.

2. Description of Related Art

With the remarkable development of information and communication technology and semiconductor technology, the manufacture and use of electronic devices has rapidly increased. These electronic devices may provide various operations by convergence rather than by being implemented in their typical unique domains.

Recently, cameras have been basically implemented in portable electronic devices such as, but not limited to, smartphones, tablet personal computers (PCs), and laptop computers, and an auto focus (AF) operation, an image stabilization (IS) operation, and a zoom operation has been added to the cameras of these portable electronic devices.

As the form factor of electronic devices on which a camera module is mounted becomes thinner, a thickness of the camera module also becomes thinner, and in order to achieve a thin camera module, it is desirous to reduce the size of component parts.

The above information disclosed in this Background section is only for enhancement of understanding of the background of the disclosure, and therefore it may contain information that does not form the prior art that is already known.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a lens driver includes a plurality of first coils disposed on a first substrate that extends in a first direction, a second coil disposed on a second substrate that extends in a second direction different from the first direction, a first sensing portion disposed on the first substrate, and disposed external to the plurality of first coils so as to not overlap the plurality of first coils along the second direction, a first magnet including a first magnet portion and a second magnet portion that are respectively disposed to face at least one of the plurality of first coils along the second direction, and configured to have different magnetic poles along the first direction, and a second magnet disposed to face the first sensing portion along the second direction, wherein a second distance between the first substrate and the second magnet along the second direction is greater than a first distance between the first substrate and the first magnet along the second direction.

The first sensing portion may be disposed between the first substrate and the second magnet.

A thickness of the first magnet along the second direction may be different from a thickness of the second magnet along the second direction.

The plurality of first coils may be fine pattern (FP) coils which have a pattern integrally formed on the first substrate.

The lens driver may further include a second sensing portion disposed on the second substrate and disposed external to the second coil so as to not overlap the second coil along the first direction, a third magnet disposed to face the second coil along the first direction, and a fourth magnet disposed to the second sensing portion along the first direction, wherein a fourth distance between the second substrate and the fourth magnet along the first direction is greater than a third distance between the second substrate and the third magnet along the first direction.

The second sensing portion may be disposed between the second substrate and the fourth magnet.

A thickness of the third magnet along the first direction may be different from a thickness of the fourth magnet along the first direction.

The second coil may be a fine pattern (FP) coil which has a pattern integrally formed on the second substrate.

The lens driver may further include a first yoke disposed on a rear surface of the first magnet, and a second yoke disposed on a rear surface of the second magnet, wherein the first yoke includes a protrusion that overlaps the first magnet along a third direction perpendicular to the first direction and the second direction, and the second yoke includes a protrusion that overlaps the second magnet along the third direction.

The lens driver may include a third sensing portion disposed on the first substrate and disposed external to the plurality of first coils so as to not overlap the plurality of first coils along the second direction, and a fifth magnet disposed to face the third sensing portion along the second direction, wherein a third distance between the first substrate and the fifth magnet along the second direction may be greater than the first distance between the first substrate and the first magnet.

The third sensing portion may be disposed between the first substrate and the fifth magnet.

A thickness of the first magnet along the second direction may be different from a thickness of the fifth magnet along the second direction.

The lens driver may further include a third yoke disposed on a rear surface of the fifth magnet, wherein the third yoke includes a protrusion that overlaps the fifth magnet along the third direction perpendicular to the first direction and the second direction.

The lens driver may further include a first connection member configured to connect the first magnet and the second magnet, and a second connection member configured to connect the first magnet and the fifth magnet.

The first connection member and the second connection member may be respectively disposed at a first end of the first magnet and a second end of the first magnet along the first direction.

In a general aspect, a lens driver includes a plurality of first coils disposed on a first substrate that extends in a first direction, a second coil disposed on a second substrate that extends in a second direction different from the first direction, a plurality of first sensing portions disposed to respectively overlap the plurality of first coils of the first substrate along the second direction, a second sensing portion disposed to overlap the second coil of the second substrate along the first direction, a first magnet including a first magnet portion and a second magnet portion that are respectively disposed to face at least one of the plurality of first coils along the second direction, and configured to have different magnetic poles along the first direction, and a second magnet disposed to face the second coil along the first direction, wherein the plurality of first coils and the second coil are fine pattern (FP) coils which have a pattern integrally formed on a substrate.

Each of the plurality of first sensing portions may be disposed inside the plurality of first coils.

The plurality of first sensing portions may be embedded inside the first substrate.

The first magnet may be disposed to overlap the plurality of first coils and the plurality of first sensing portions along the second direction.

The lens driver may further include a first yoke disposed on a rear surface of the first magnet, and a second yoke disposed on a rear surface of the second magnet, wherein the first yoke includes a protrusion that overlaps the first magnet along a third direction perpendicular to the first and second directions, and wherein the second yoke includes a protrusion that overlaps the second magnet along the third direction.

Other features and aspects will be apparent from the following detailed description, the drawings, and the claims.

Figure 1:
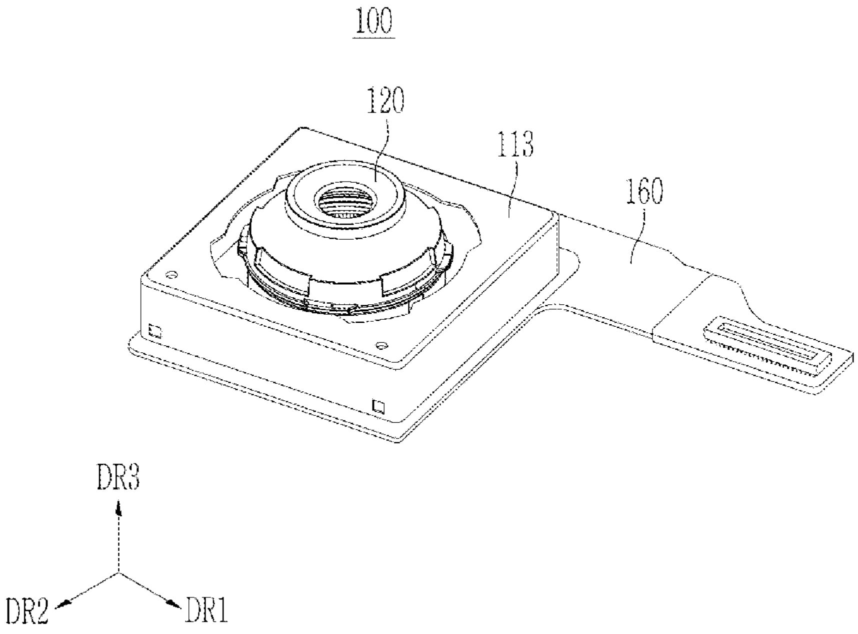
FIG. 1 illustrates a perspective view of an example camera module, in accordance with one or more embodiments.

Throughout the drawings and the detailed description, unless otherwise described or provided, it shall be understood that the same drawing reference numerals refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure. For example, the sequences of operations described herein are merely examples, and are not limited to those set forth herein, but may be changed as will be apparent after an understanding of the disclosure, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples. Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Unless otherwise defined, all terms, including technical and scientific terms, used herein have the same meaning as is commonly understood by one of ordinary skill in the art to which this disclosure pertains. Terms, such as those defined in commonly used dictionaries, should be construed to have meanings matching with contextual meanings in the relevant art and the present disclosure, and are not to be construed as having an ideal or excessively formal meaning unless otherwise defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, a first direction DR1 may mean a direction perpendicular to an optical axis. A second direction DR2 may mean a direction perpendicular to the optical axis and the first direction DR1. Additionally, a third direction DR3 may mean a direction parallel to the optical axis and perpendicular to the first direction DR1 and the second direction DR2.

One or more examples may provide a lens driver that may be provided in a thin shape while maintaining a driving force for lens movement without an increase in driving voltage.

In one or more examples, a thin lens driver may be provided while maintaining a driving force to move a lens without increasing a driving voltage.

A camera module, in accordance with one or more embodiments, will be described with reference to FIG. 1. FIG. 1 illustrates a perspective view of an example camera module, in accordance with one or more embodiments, and FIG. 2 illustrates a schematic exploded perspective view of an example camera module, in accordance with one or more embodiments.

Figure 2:
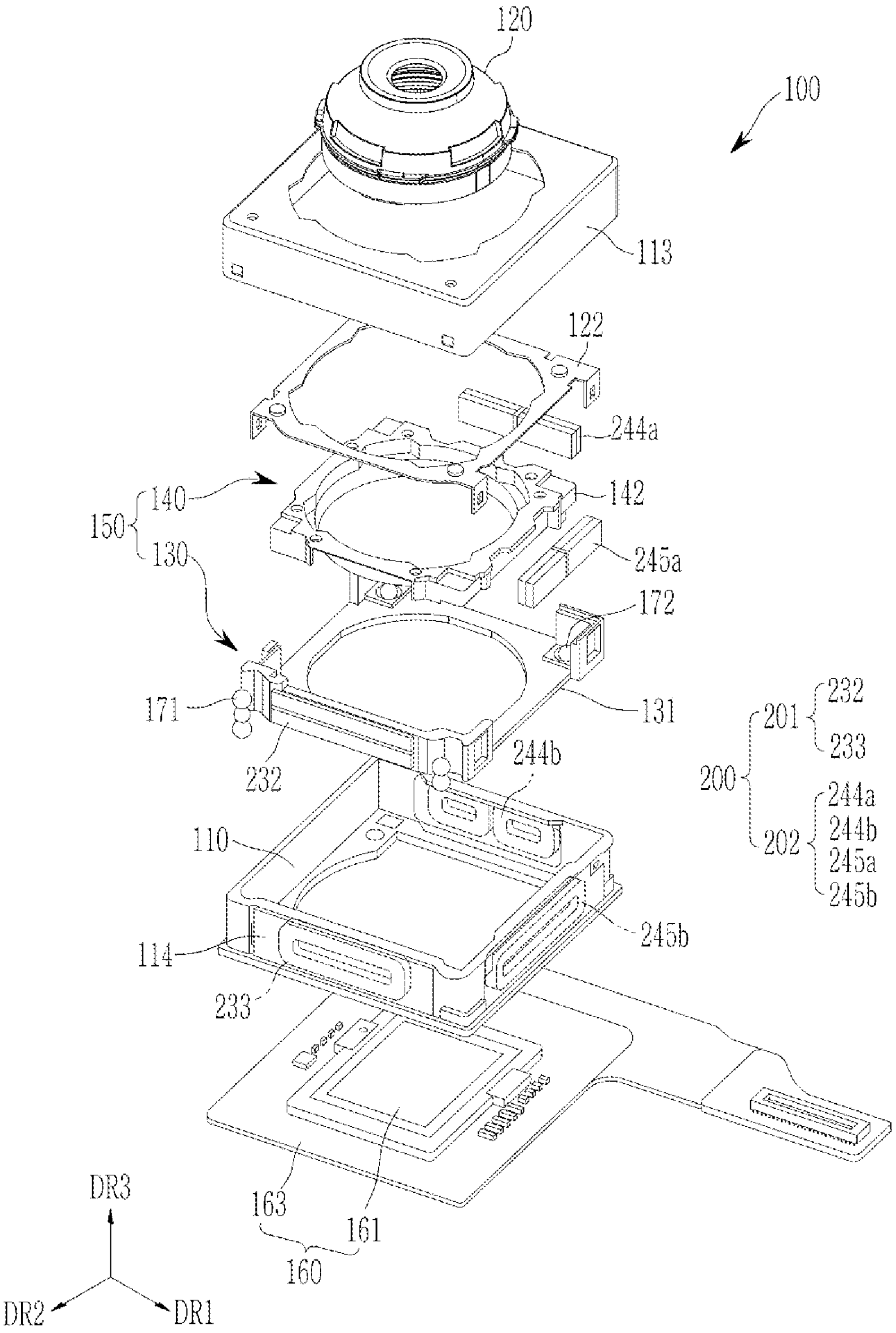
FIG. 2 illustrates a schematic exploded perspective view of an example camera module, in accordance with one or more embodiments.

Referring to FIG. 1 and FIG. 2, an example camera module 100, in accordance with one or more embodiments, may include a lens barrel 120, a lens driving device 150 that moves the lens barrel 120, an image sensor unit 160 that converts light incident through the lens barrel 120 into an electrical signal, a housing 110 that accommodates the lens barrel 120 and the lens driving device 150, and a cover 113.

The lens driving device 150 is a device that moves the lens barrel 120, and may include a focus adjusting unit 130, that adjusts a focus, and a shake correcting unit 140 that corrects hand-shake.

The focus adjusting unit 130 may include a carrier 131 that accommodates the lens barrel 120, and a focus adjusting driver 201 that generates a driving force to move the lens barrel 120 and the carrier 131 in an optical axis direction.

The focus adjusting driver 201 may include a magnet 232 and a coil 233. The magnet 232 of the focus adjusting driver 201 may be mounted on one surface of the carrier 131, and the coil 233 may be formed in a substrate 114 to be mounted on the housing 110.

When power from a power source is applied to the coil 233, the carrier 131 may be moved in an optical axis direction by the electromagnetic force between the magnet 232 and the coil 233. Since the lens barrel 120 is accommodated in the carrier 131, the lens barrel 120 may also be moved in the optical axis direction based on the movement of the carrier 131.

When the carrier 131 is moved, a first rolling member 171 may be disposed between the carrier 131 and the housing 110, and may reduce friction between the carrier 131 and the housing 110. In an example, the first rolling member 171 may be in a form of a ball, and may be disposed at both sides of the magnet 232. A guide groove may be formed in the carrier 131 so that the first rolling member 171 is accommodated and guided in the optical axis direction.

The shake correcting unit 140 includes a lens holder 142 that guides movement of the lens barrel 120 and a shake correcting driver 202 that generates a driving force to move the lens holder 142 in a direction perpendicular to the optical axis direction.

The lens holder 142 is inserted into the carrier 131 to be disposed in the optical axis direction, and guides a movement of the lens barrel 120. The lens holder 142 may have a substantially quadrangular frame shape. Magnets 244*a* and 245*a*, which perform hand-shake correction, may be disposed on two adjacent side surfaces of the lens holder 142.

The shake correcting driver 202 may include the magnets 244*a* and 245*a* and coils 244*b* and 245*b*. The magnets 244*a* and 245*a* of the shake correcting driver 202 may be mounted on the lens holder 142, and the coils 244*b* and 245*b* respectively facing the magnets 244*a* and 245*a* may be formed on the substrate 114 to be fixedly mounted on the housing 110 via the substrate 114.

A plurality of second rolling members 172 may be provided to support the shake correcting unit 140, and the plurality of second rolling members 172 may guide the lens holder 142 in the shake correcting process. Additionally, the second rolling members 172 may also maintain a distance between the carrier 131 and the lens holder 142.

The image sensor unit 160 is a device that converts light incident through the lens barrel 120 into an electrical signal. In an example, the image sensor unit 160 may include an image sensor 161 and a printed circuit board 163 connected to the image sensor 161, and may further include an infrared filter. The infrared filter blocks light in an infrared region among light incident through the lens barrel 120.

The image sensor 161 converts light incident through the lens barrel 120 into an electrical signal. For example, the image sensor 161 may be a charge coupled device (CCD) or a complementary metal-oxide semiconductor (CMOS). The electrical signal converted by the image sensor 161 is outputted as an image through a display unit of a portable electronic device. The image sensor 161 is fixed to the printed circuit board 163, and may be electrically connected to the printed circuit board 163.

The lens barrel 120 and the lens driving device are accommodated in a space inside the housing 110, and for example, the housing 110 may have a box shape in which upper and lower portions are opened. The image sensor unit 160 is disposed at a lower portion of the housing 110.

A stopper 122 may be further disposed at an upper portion of the lens barrel 120 to prevent a frame 141 and the lens holder 142 from being separated from an inner space of the carrier 131, and the stopper 122 may be combined with the carrier 131.

The cover 113 is combined with the housing 110 to cover an outer surface of the housing 110, and may protect internal components of the camera module. In an example, the cover 113 may have a boss structure for coupling with the housing 110 or other components on one surface thereof. Additionally, the cover 113 may shield electromagnetic waves. In an example, the cover 113 may shield electromagnetic waves so that electromagnetic waves generated by the camera module do not affect other electronic components in a portable electronic device.

Additionally, since the portable electronic device is equipped with several electronic components in addition to the camera module, the cover 113 may shield electromagnetic waves so that electromagnetic waves generated from these electronic components do not affect the camera module. The cover 113 may be provided with a metallic material to be grounded to a ground pad provided in the printed circuit board 163, thereby shielding electromagnetic waves.

Hereinafter, the lens driver, which is the shake correcting driver described above, will be described in more detail.

Figure 3:
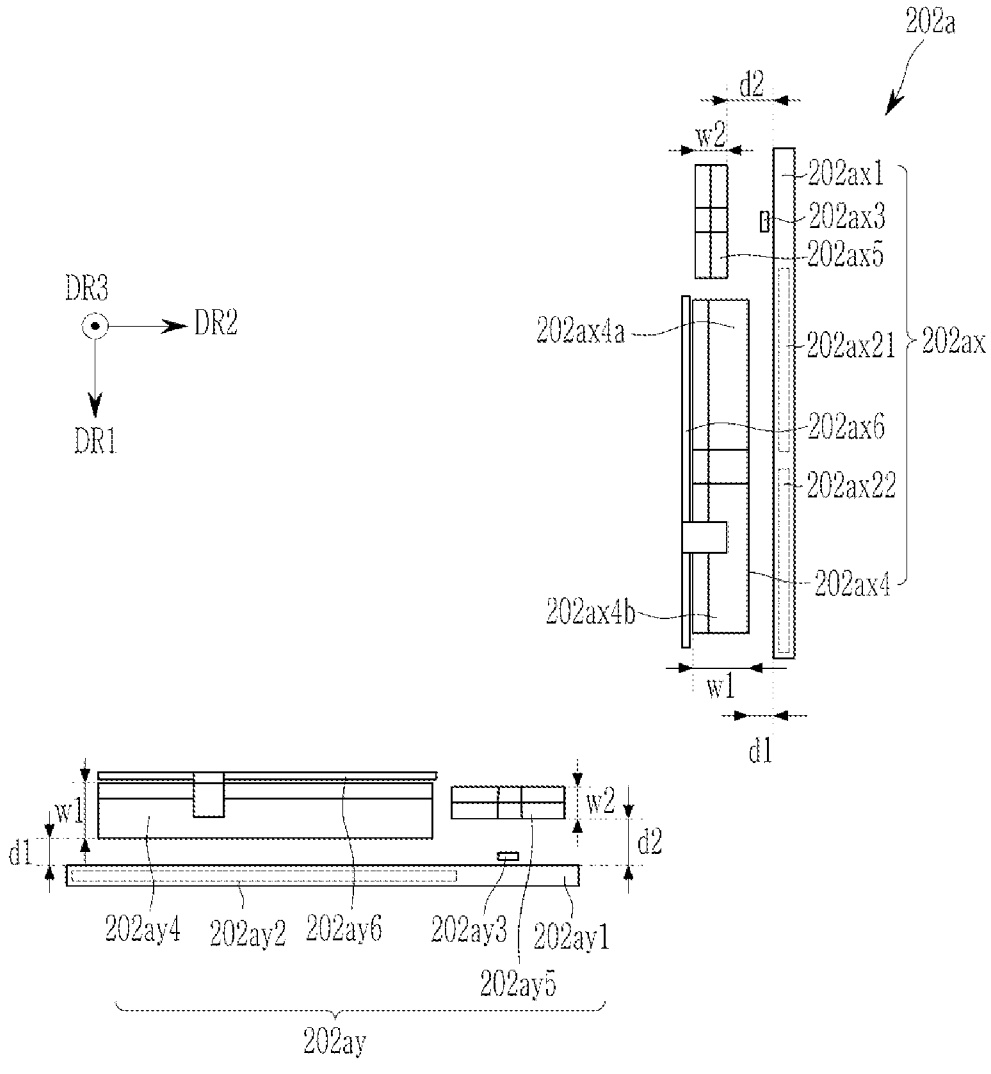
FIG. 3 illustrates a top plan view of an example lens driver, in accordance with one or more embodiments.

Referring to FIG. 3, a lens driver, in accordance with one or more embodiments, will be described. FIG. 3 illustrates a top plan view of a lens driver, in accordance with one or more embodiments.

Referring to FIG. 3, a lens driver 202*a*, in accordance with one or more embodiments, may include a first lens driver 202*ax* extending in parallel with the first direction DR1, and a second lens driver 202*ay* extending in parallel with the second direction DR2 different from the first direction DR1.

The first lens driver 202*ax* may include a substrate 202*ax*1, a plurality of coils 202*ax*21 and 202*ax*22, a sensing portion 202*ax*3, a first magnet 202*ax*4, a second magnet 202*ax*5, and a yoke 202*ax*6.

The plurality of coils 202*ax*21 and 202*ax*22 of the first lens driver 202*ax* may be formed in the substrate 202*ax*1. In an example, the plurality of coils 202*ax*21 and 202*ax*22 may be winding coils or fine pattern (FP) coils embedded in the substrate 202*ax*1. The FP coil may have an integrally formed pattern on the substrate. Additionally, the FP coil may be formed in a plate shape, so it may be easily attached to the housing 110.

The sensing portion 202*ax*3 may include a sensor such as, but not limited to, a Hall sensor, and may be disposed outside the plurality of coils 202*ax*21 and 202*ax*22 on the substrate 202*ax*1. The sensing portion 202*ax*3 may not overlap the plurality of coils 202*ax*21 and 202*ax*22 along the first direction DR1 and the third direction DR3 in which the substrate 202*ax*1 extends. Additionally, the sensing portion 202*ax*3 may also not overlap the plurality of coils 202*ax*21 and 202*ax*22 along the second direction DR2. The second direction DR2 is perpendicular to the first direction DR1 and the third direction DR3, and may be a direction in which the substrate 202*ax*1 and the first magnet 202*ax*4 and the second magnet 202*ax*5 face each other.

The first magnet 202*ax*4 and the second magnet 202*ax*5 of the first lens driver 202*ax* may be separated to be spaced apart from each other. The first magnet 202*ax*4 may face the plurality of coils 202*ax*21 and 202*ax*22 along the second direction DR2. The first magnet 202*ax*4 may include a first magnet portion 202*ax*4*a* and a second magnet portion 202*ax*4*b* respectively facing at least one of the plurality of coils 202*ax*21 and 202*ax*22 along the second direction DR2. In an example, the first magnet portion 202*ax*4*a* and the second magnet portion 202*ax*4*b* may have different magnetic poles along the first direction DR1. The second magnet 202*ax*5 may face the sensing portion 202*ax*3 along the second direction DR2 and at least partially face the plurality of coils 202*ax*21 and 202*ax*22.

In a distance measured along the second direction DR2, a second distance d2 between the substrate 202*ax*1 and the second magnet 202*ax*5 may be greater than a first distance d1 between the substrate 202*ax*1 and the first magnet 202*ax*4. A distance from which the second magnet 202*ax*5 is separated from the surface of the substrate 202*ax*1 along the second direction DR2 may be greater than a distance from which the first magnet 202*ax*4 is separated from the surface of the substrate 202*ax*1 along the second direction DR2.

In a thickness along the second direction DR2, a first thickness w1 of the first magnet 202*ax*4 and a second thickness w2 of the second magnet 200*ax*5 may be different from each other. In an example, in the thickness along the second direction DR2, the first thickness w1 of the first magnet 202*ax*4 may be greater than the second thickness w2 of the second magnet 200*ax*5. In a non-limited example, a surface of the first magnet 202*ax*4 and a surface of the second magnet 200*ax*5 may be aligned and disposed along the first direction DR1. In the thickness along the second direction DR2 from the surface on which the first magnet 202*ax*4 and the second magnet 202*ax*5 are aligned and disposed, the thickness of the first magnet 202*ax*4 may be greater than the thickness of the second magnet 202*ax*5.

In an example, the yoke 202*ax*6 may be disposed on a rear surface of the first magnet 202*ax*4. The yoke 202*ax*6 may be flat along the first direction DR1. The yoke 202*ax*6 may include a protrusion overlapping the first magnet 202*ax*4 along the third direction DR3.

In a non-limited example, along the second direction DR2, the sensing portion 202*ax*3 may be disposed between the substrate 202*ax*1 and the second magnet 202*ax*5. The second magnet 202*ax*5 may be disposed farther from the substrate 202*ax*1 than the first magnet 202*ax*4, so that a space in which the sensing portion 202*ax*3 may be disposed is secured between the substrate 202*ax*1 and the second magnet 202*ax*5. Additionally, a relatively small first distance d1 may be maintained between the first magnet 202*ax*4 and the coil 202*ax*22 formed in the substrate 202*ax*1, so that the driving force due to the electromagnetic force between the first magnet 202*ax*4 and the coil 202*ax*22 formed in the substrate 202*ax*1 may not decrease.

When the distance between the substrate 202*ax*1 and the first magnet 202*ax*4 is the same as the distance between the substrate 202*ax*1 and the second magnet 202*ax*5, in order to maintain a space to dispose the sensing portion 202*ax*3, a distance between the substrate 202*ax*1 and the first magnet 202*ax*4 may be the second distance d2. Additionally, compared to the example in which the distance between the substrate 202*ax*1 and the first magnet 202*ax*4 is the first distance d1, the distance between the substrate 202*ax*1 and the first magnet 202*ax*4 may be widened. As described above, when the distance between the substrate 202*ax*1 and the first magnet 202*ax*4 is widened and when the same driving voltage is applied, the electromagnetic force between the first magnet 202*ax*4 and the plurality of coils 202*ax*21 and 202*ax*22 disposed in the substrate 202*ax*1 may decrease, and thus the driving voltage applied to the lens driver may increase.

However, as described above, in the lens driver, in accordance with one or more embodiments, the plurality of coils 202*ax*21 and 202*ax*22 may be formed in the substrate 202*ax*1, and the second magnet 202*ax*5 facing the sensing portion 202*ax*3 may be disposed farther from the substrate 202*ax*1 than the first magnet 202*ax*4 facing the plurality of coils 202*ax*21 and 202*ax*22, so that the sensing portion 202*ax*3 may be disposed between the substrate 202*ax*1 and the second magnet 202*ax*5. Accordingly, a decrease in the electromagnetic force between the first magnet 202*ax*4 and the substrate 202*ax*1 may be prevented, so that the lens driving force may be maintained without increasing the driving voltage applied to the lens driver. Additionally, by forming the plurality of coils 202*ax*21 and 202*ax*22 of the lens driver in the substrate 202*ax*1, the lens driver may be implemented in a thin shape.

Similar to the first lens driver 202*ax*, the second lens driver 202*ay* may include a substrate 202*ay*1, a coil 202*ay*2, a sensing portion 202*ay*3, a first magnet 202*ay*4, a second magnet 202*ay*5, and a yoke 202*ay*6.

The coil 202*ay*2 of the second lens driver 202*ay* may be a winding coil embedded in the substrate 202*ay*1 or a fine pattern (FP) coil. The FP coil may have an integrally formed pattern on the substrate. Additionally, the FP coil may be formed in a plate shape, so it may be easily attached to the housing 110.

The sensing portion 202*ay*3 may include a sensor such as, but not limited to, a Hall sensor, and may be disposed outside the coil 202*ay*2 on the substrate 202*ay*1. The sensing portion 202*ay*3 may not overlap the coil 202*ay*2 along the second direction DR2 and the third direction DR3 in which the substrate 202*ay*1 extends. Additionally, the sensing portion 202*ay*3 may not overlap the coil 202*ay*2 along the first direction DR2. The first direction DR1 is perpendicular to the second direction DR2 and the third direction DR3, and may be a direction in which the substrate 202*ay*1 and the first magnet 202*ay*4 and the second magnet 202*ay*5 face each other.

The first magnet 202*ay*4 and the second magnet 202*ay*5 of the second lens driver 202*ay* are separated to be spaced apart from each other, the first magnet 202*ay*4 may face the coil 202*ay*2 along the first direction DR1, and the second magnet 202*ay*5 may face the sensing portion 202*ay*3 and may at least partially face the coil 202*ay*2. The second magnet 202*ay*5 may include first and second magnet portions having different magnetic poles.

In a distance measured along the first direction DR1, the second distance d2 between the substrate 202*ay*1 and the second magnet 202*ay*5 may be greater than the first distance d1 between the substrate 202*ay*1 and the first magnet 202*ay*4. A distance from which the second magnet 202*ay*5 is separated from the surface of the substrate 202*ay*1 along the first direction DR1 may be greater than a distance from which the first magnet 202*ay*4 is separated from the surface of the substrate 202*ay*1 along the first direction DR1.

In a thickness along the first direction DR1, the first thickness w1 of the first magnet 202*ay*4 and the second thickness w2 of the second magnet 202*ay*5 may be different from each other. In an example, in the thickness along the first direction DR1, the first thickness w1 of the first magnet 202*ay*4 may be greater than the second thickness w2 of the second magnet 202*ay*5. In a non-limited example, the surface of the first magnet 202*ay*4 and the surface of the second magnet 200*ay*5 may be aligned, and may be disposed along the second direction DR2. In the thickness along the first direction DR1 from the surface on which the first magnet 202*ay*4 and the second magnet 202*ay*5 are aligned and disposed, the thickness of the first magnet 202*ay*4 may be greater than the thickness of the second magnet 202*ay*5.

In an example, the yoke 202*ay*6 may be disposed on a rear surface of the first magnet 202*ay*4. The yoke 202*ax*6 may be flat along the second direction DR2. The yoke 202*ay*6 may include a protrusion overlapping the first magnet 202*ay*4 along the third direction DR3.

Along the first direction DR1, the sensing portion 202*ay*3 may be disposed between the substrate 202*ay*1 and the second magnet 202*ay*5. The second magnet 202*ay*5 may be disposed farther from the substrate 202*ay*1 than the first magnet 202*ay*4, so that a space in which the sensing portion 202*ay*3 may be disposed is secured between the substrate 202*ay*1 and the second magnet 202*ay*5. Additionally, a relatively small first distance d1 may be maintained between the first magnet 202*ay*4 and the coil 202*ay*2 formed in the substrate 202*ay*1, so that the driving force due to the electromagnetic force between the first magnet 202*ay*4 and the coil 202*ay*2 formed in the substrate 202*ay*1 may not decrease, thereby preventing an increase in driving voltage. Additionally, by embedding the coil 202*ay*2 of the second lens driver 202*ay* in the substrate 202*ay*1, the second lens driver 202*ay* may have a thin form factor.

The sensing portion 202*ax*3, the second magnet 202*ax*5, and the plurality of coils 202*ax*21 and 202*ax*22 of the first lens driver 202*ax* may detect a position change of the lens barrel in a direction parallel to the second direction DR2. Additionally, in order to correct the position change, the plurality of coils 202*ax*21 and 202*ax*22 and the first magnet 202*ax*4 of the first lens driver 202*ax* may move the lens barrel in a direction parallel to the second direction DR2. The sensing portion 202*ay*3, the second magnet 202*ay*5, and the coil 202*ay*2 of the second lens driver 202*ay* may sense a position change of the lens barrel according to a direction parallel to first direction DR1 and second direction DR2. Additionally, in order to correct the position change, the coil 202*ay*2 and the first magnet 202*ay*4 of the second lens driver 202*ay* may move the lens barrel in a direction parallel to the first direction DR1.

In a non-limited example, the substrate 202*ax*1 of the first lens driver 202*ax* and the substrate 202*ay*1 of the second lens driver 202*ay* may be one substrate connected to each other.

As described with reference to FIG. 1 and FIG. 2, the focus adjusting driver 201 may generate a driving force to move the lens barrel 120 in the optical axis direction, for example, in the third direction DR3, and the shake correcting driver 202 may generate a driving force to move the lens barrel 120 in the first and second directions DR1 and DR2 perpendicular to the third direction DR3.

In an example, the first lens driver 202*ax* and the second lens driver 202*ay* of the lens driver 202*a* may be the shake correcting driver 202, and when a shaking error occurs in the camera module, and they may move the lens barrel 120 in the first and second directions DR1 and DR2 perpendicular to the third direction DR3 to correct movement caused by shaking.

In an example, the sensing portion 202*ax*3 of the first lens driver 202*ax* may collect sensor information according to the movement of the lens barrel 120 in the second direction DR2. The sensing portion 202*ay*3 of the second lens driver 202*ay* may collect sensor information according to the movement of the lens barrel 120 in the first direction DR1 and the second direction DR2. The sensing portion 202*ax*3 of the first lens driver 202*ax* and the sensing portion 202*ay*3 of the second lens driver 202*ay* may be electrically connected to the printed circuit board 163. Additionally, the sensing portion 202*ax*3 of the first lens driver 202*ax* and the sensing portion 202*ay*3 of the second lens driver 202*ay* may transmit the collected sensor information to a first processor (for example, a control circuit) of the camera module 100 through the printed circuit board 163, or a second processor of the electronic device on which the camera module 100 is mounted. The printed circuit board 163 may be connected to the first processor (or the control circuit) related to driving the camera module 100 or the second processor of the electronic device on which the camera module 100 is mounted.

According to the control of at least one of the first processor and the second processor, the printed circuit board 163 may supply a signal of a specified magnitude (for example: a current of a specified magnitude) to at least one of the plurality of coils 202*ax*21 and 202*ax*22 and the coil 202*ay*2. Accordingly, rotation occurring in the lens module 120 may be compensated to prevent deterioration of image quality of the camera module 100. As a specific example, at least one of the plurality of coils 202*ax*21 and 202*ax*22 may be controlled so that a sum of a value of the sensor information according to the movement of the lens barrel 120 in the second direction DR2 collected by the sensing portion 202*ax*3 of the first lens driver 202*ax* and a value of the sensor information according to the movement of the lens barrel 120 in the second direction DR2 collected by the sensing portion 202*ay*3 of the second lens driver 202*ay* becomes zero. In this example, processing such as linear regression may be performed on the sensor information.

Figure 4:
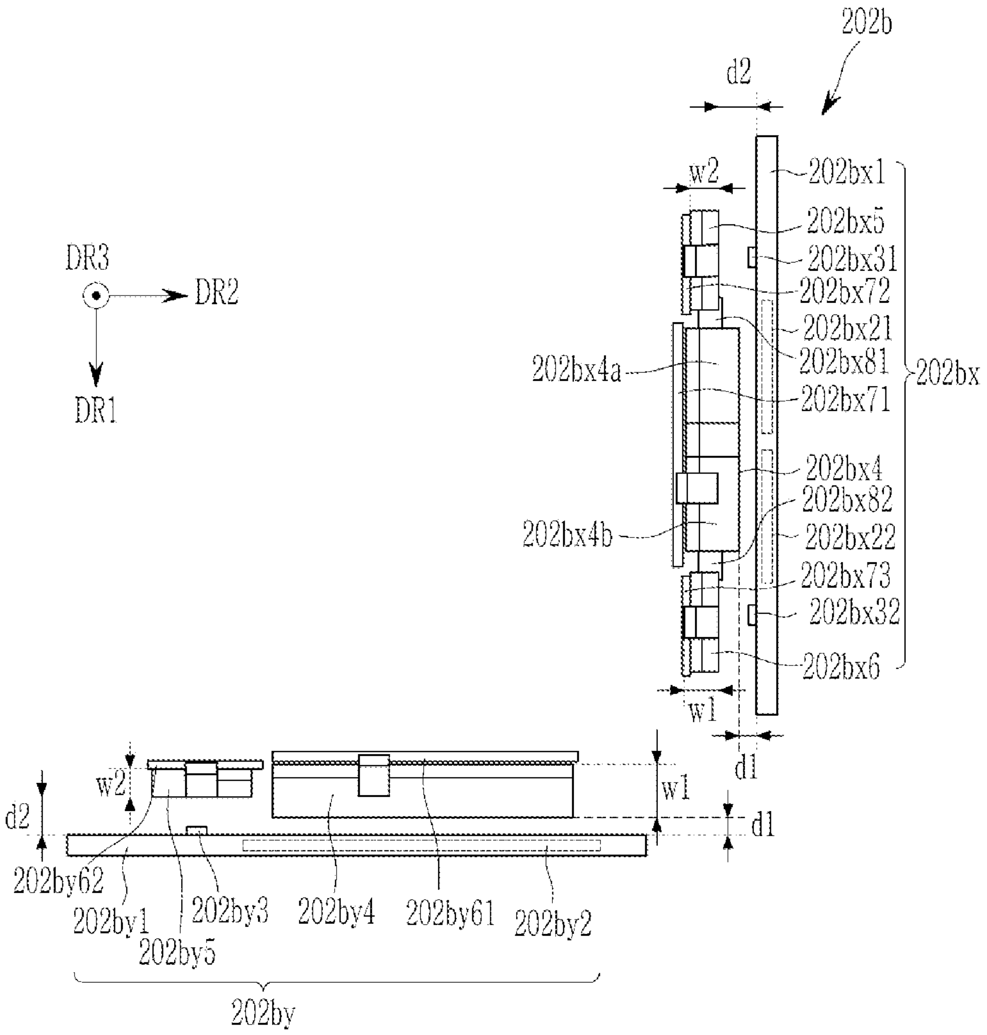
FIG. 4 illustrates a top plan view of an example lens driver, in accordance with one or more embodiments.

Hereinafter, an example lens driver, in accordance with one or more embodiments, will be described with reference to FIG. 4. FIG. 4 illustrates a top plan view of an example lens driver, in accordance with one or more embodiments.

Referring to FIG. 4, a lens driver 202*b*, in accordance with one or more embodiments, may include a first lens driver 202*bx* extending in parallel to the first direction DR1, and a second lens driver 202*by* extending in parallel to the second direction DR2 different from the first direction DR1.

The first lens driver 202*bx* includes a substrate 202*bx*1, a plurality of coils 202*bx*21 and 202*bx*22, a first sensing portion 202*bx*31, a second sensing portion 202*bx*32, a first magnet 202*bx*4, a second magnet 202*bx*5, a third magnet 202*bx*6, a first yoke 202*bx*71, a second yoke 202*bx*72, a third yoke 202*bx*73, a first connection member 202*bx*81, and a second connection member 202*bx*82.

The plurality of coils 202*bx*21 and 202*bx*22 of the first lens driver 202*bx* may be formed in the substrate 202*bx*1. In an example, the plurality of coils 202*bx*21 and 202*bx*22 may be winding coils or fine pattern (FP) coils embedded in the substrate 202*bx*1. The FP coil may have an integrally formed pattern on the substrate. Additionally, in an example, the FP coil may be formed in a plate shape, so it may be easily attached to the housing 110.

The first sensing portion 202*bx*31 and the second sensing portion 202*bx*32 may include a sensor such as, but not limited to, a Hall sensor, and may be disposed outside the plurality of coils 202*bx*21 and 202*bx*22 on the substrate 202*bx*1. In an example, the first sensing portion 202*bx*31 and the second sensing portion 202*bx*32 may not overlap the plurality of coils 202*bx*21 and 202*bx*22 along the first direction DR1 and the third direction DR3 in which the substrate 202*bx*1 extends. Additionally, in an example, the first sensing portion 202*bx*31 and the second sensing portion 202*bx*32 may not overlap the plurality of coils 202*bx*21 and 202*bx*22 along the second direction DR2. The second direction DR2 is perpendicular to the first direction DR1 and the third direction DR3, and may be a direction in which the substrate 202*bx*1 and the first magnet 202*bx*4, the second magnet 202*bx*5, and the third magnet 202*bx*6 face each other.

The first magnet 202*bx*4, the second magnet 202*bx*5, and the third magnet 202*bx*6 of the first lens driver 202*bx* may be separated from each other and spaced apart from each other. The first magnet 202*bx*4 may face the plurality of coils 202*bx*21 and 202*bx*22 along the second direction DR2. The first magnet 202*bx*4 may include a first magnet portion 202*bx*4*a* and a second magnet portion 202*bx*4*b* respectively facing at least one of the plurality of coils 202*bx*21 and 202*bx*22 along the second direction DR2. The first magnet portion 202*bx*4*a* and the second magnet portion 202*bx*4*b* may have different magnetic poles along the first direction DR1. The second magnet 202*bx*5 may face the first sensing portion 202*bx*31 along the second direction DR2 and at least partially face the plurality of coils 202*bx*21 and 202*bx*22. The third magnet 202*bx*6 may face the second sensing portion 202*bx*32 along the second direction DR2 and at least partially face the plurality of coils 202*bx*21 and 202*bx*22.

A first connection member 202*bx*81 and a second connection member 202*bx*82 may be disposed at both ends of the first magnet 202*bx*4 along the first direction DR1. The first connection member 202*bx*81 may connect the first magnet 202*bx*4 and the second magnet 202*bx*5. The second connection member 202*bx*82 may connect the first magnet 202*bx*4 and the third magnet 202*bx*6.

In a distance measured along the second direction DR2, a second distance d2 between the substrate 202*bx*1 and the second magnet 202*bx*5 or the third magnet 202*bx*6 may be greater than a first distance d1 between the substrate 202*bx*1 and the first magnet 202*bx*4. A distance from which the second magnet 202*bx*5 is separated from the surface of the substrate 202*bx*1 along the second direction DR2 may be greater than a distance from which the first magnet 202*bx*4 is separated from the surface of the substrate 202*bx*1 along the second direction DR2.

In a thickness along the second direction DR2, a first thickness w1 of the first magnet 202*bx*4 and a second thickness w2 of the second magnet 202*bx*5 or the third magnet 202*bx*6 may be different from each other. For example, in the thickness along the second direction DR2, the first thickness w1 of the first magnet 202*bx*4 may be greater than the second thickness w2 of the second magnet 202*bx*5 or the third magnet 202*bx*6. In an example, a surface of the first magnet 202*bx*4 and a surface of the second magnet 202*bx*5 or the third magnet 202*bx*6 may be aligned and disposed along the first direction DR1. In the thickness along the second direction DR2 from the surface on which the first magnet 202*bx*4 and the second magnet 202*bx*5 or the third magnet 202*bx*6 are aligned and disposed, the thickness of the first magnet 202*bx*4 is greater than the thickness of the second magnet 202*bx*5 or the third magnet 202*bx*6.

The first yoke 202*bx*71 may be disposed on a rear surface of the first magnet 202*bx*4. The first yoke 202*bx*71 may be flat along the first direction DR1. The first yoke 202*bx*71 may include a protrusion overlapping the first magnet 202*bx*4 along the third direction DR3.

The second yoke 202*bx*72 may be disposed on a rear surface of the second magnet 202*bx*5. The second yoke 202*bx*72 may be flat along the first direction DR1. The second yoke 202*bx*72 may include a protrusion overlapping the second magnet 202*bx*5 along the second direction DR2.

The third yoke 202*bx*73 may be disposed on a rear surface of the third magnet 202*bx*6. The third yoke 202*bx*73 may be flat along the first direction DR1. The third yoke 202*bx*73 may include a protrusion overlapping the third magnet 202*bx*6 along the third direction DR3.

Along the second direction DR2, the first sensing portion 202*bx*31 may be disposed between the substrate 202*bx*1 and the second magnet 202*bx*5. The second magnet 202*bx*5 may be disposed farther from the substrate 202*bx*1 than the first magnet 202*bx*4, so that a space in which the first sensing portion 202*bx*31 may be disposed is secured between the substrate 202*bx*1 and the second magnet 202*bx*5. Along the second direction DR2, the second sensing portion 202*bx*32 may be disposed between the substrate 202*bx*1 and the third magnet 202*bx*6. The third magnet 202*bx*6 may be disposed farther from the substrate 202*bx*1 than the first magnet 202*bx*4, so that a space in which the second sensing portion 202*bx*32 may be disposed is secured between the substrate 202*bx*1 and the third magnet 202*bx*6. Additionally, a relatively small first distance d1 is maintained between the first magnet 202*bx*4 and the plurality of coils 202*bx*21 and 202*bx*22 formed in the substrate 202*bx*1, so that the driving force due to the electromagnetic force between the first magnet 202*bx*4 and the plurality of coils 202*bx*21 and 202*bx*22 formed in the substrate 202*bx*1 may not decrease.

When the distance between the substrate 202*bx*1 and the first magnet 202*bx*4 is the same as the distance between the substrate 202*bx*1 and the second magnet 202*bx*5 and the second magnet 202*bx*6, in order to maintain a space to dispose the first sensing portion 202*bx*31 and the second sensing portion 202*bx*32, a distance between the substrate 202*bx*1 and the first magnet 202*bx*4 may be the second distance d2. Additionally, compared to the example in which the distance between the substrate 202*bx*1 and the first magnet 202*bx*4 is the first distance d1, the distance between the substrate 202*bx*1 and the first magnet 202*bx*4 may be widened. As described above, when the distance between the substrate 202*bx*1 and the first magnet 202*bx*4 is widened, and when the same driving voltage is applied, the electromagnetic force between the first magnet 202*bx*4 and the plurality of coils 202*bx*21 and 202*bx*22 disposed in the substrate 202*bx*1 may decrease, and thus the driving voltage applied to the lens driver may increase.

However, as described above, in the example lens driver, in accordance with one or more embodiments, the plurality of coils 202*bx*21 and 202*bx*22 are formed in the substrate 202*bx*1, and the second magnet 202*bx*5 and the third magnet 202*bx*6 respectively facing the first sensing portion 202*bx*31 and the second sensing portion 202*bx*32 may be disposed farther from the substrate 202*bx*1 than the first magnet 202*bx*4 facing the plurality of coils 202*bx*21 and 202*bx*22, so that first sensing portion 202*bx*31 and the second sensing portion 202*bx*32 may be disposed between the substrate 202*bx*1 and the second magnet 202*bx*5 and the third magnet 202*bx*6. Accordingly, a decrease in the electromagnetic force between the first magnet 202*bx*4 and the substrate 202*bx*1 may be prevented, so that the lens driving force may be maintained without increasing the driving voltage applied to the lens driver. Additionally, by forming the plurality of coils 202*bx*21 and 202*bx*22 of the lens driver in the substrate 202*bx*1, the lens driver may be implemented in a thin shape.

Similar to the first lens driver 202*bx*, the second lens driver 202*by* may include a substrate 202*by*1, a coil 202*by*2, a sensing portion 202*by*3, a first magnet 202*by*4, a second magnet 202*by*5, a first yoke 202*by*61, and a second yoke 202*by*62.

The coil 202*by*2 of the second lens driver 202*by* may be a winding coil inside the substrate 202*by*1 or a fine pattern (FP) coil. The FP coil may have an integrally formed pattern on the substrate. In addition, the FP coil may be formed in a plate shape, so it may be easily attached to the housing 110.

The sensing portion 202*by*3 may include a sensor such as, but not limited to, a Hall sensor, and may be disposed outside the coil 202*by*2 on the substrate 202*by*1. The sensing portion 202*by*3 may not overlap the coil 202*by*2 along the second direction DR2 and the third direction DR3 in which the substrate 202*by*1 extends. Additionally, the sensing portion 202*by*3 may not overlap the coil 202*by*2 along the first direction DR2. The first direction DR1 is perpendicular to the second direction DR2 and the third direction DR3, and may be a direction in which the substrate 202*by*1 and the first magnet 202*by*4 and the second magnet 202*by*5 face each other.

The first magnet 202*by*4 and the second magnet 202*by*5 of the second lens driver 202*by* are separated and spaced apart from each other, and the first magnet 202*by*4 may face the coil 202*by*2 along the first direction DR1. The second magnet 202*by*5 may face the sensing portion 202*by*3, and at least partly face the coil 202*by*2.

In a distance measured along the first direction DR1, a second distance d2 between the substrate 202*by*1 and the second magnet 202*by*5 may be greater than the first distance d1 between the substrate 202*by*1 and the first magnet 202*by*4. A distance from which the second magnet 202*by*5 is separated from the surface of the substrate 202*by*1 along the first direction DR1 may be greater than a distance from which the first magnet 202*by*4 is separated from the surface of the substrate 202*by*1 along the first direction DR1.

In a thickness along the first direction DR1, the first thickness w1 of the first magnet 202*by*4 and the second thickness w2 of the second magnet 202*by*5 may be different from each other. In an example, in the thickness along the first direction DR1, the first thickness w1 of the first magnet 202*by*4 may be greater than the second thickness w2 of the second magnet 202*by*5. In an example, the surface of the first magnet 202*by*4 and the surface of the second magnet 200*by*5 may be disposed substantially in line along the second direction DR2. In the thickness along the first direction DR1 from the surface on which the first magnet 202*by*4 and the second magnet 202*by*5 are aligned and disposed, the thickness of the first magnet 202*by*4 may be greater than the thickness of the second magnet 202*by*5.

The first yoke 202*by*61 may be disposed on a rear surface of the first magnet 202*by*4. The first yoke 202*bx*61 may be flat along the second direction DR2. The second yoke 202*by*62 may be disposed on a rear surface of the second magnet 202*by*5. The second yoke 202*bx*62 may be flat along the second direction DR2.

Along the first direction DR1, the sensing portion 202*by*3 may be disposed between the substrate 202*by*1 and the second magnet 202*by*5. The second magnet 202*by*5 may be disposed farther from the substrate 202*by*1 than the first magnet 202*by*4, so that a space in which the sensing portion 202*by*3 may be disposed is secured between the substrate 202*by*1 and the second magnet 202*by*5. Additionally, a relatively small first distance d1 is maintained between the first magnet 202*by*4 and the coil 202*by*2 formed in the substrate 202*by*1, so that the driving force due to the electromagnetic force between the first magnet 202*by*4 and the coil 202*by*2 formed in the substrate 202*by*1 may not decrease, thereby preventing an increase in driving voltage. Additionally, by embedding the coil 202*by*2 of the second lens driver 202*by* in the substrate 202*by*1, the second lens driver 202*by* may have a thin form factor.

The first sensing portion 202*bx*31, the second magnet 202*bx*5, and the plurality of coils 202*bx*21 and 202*bx*22 of the first lens driver 202*bx* may detect a position change of the lens barrel in a direction parallel to the second direction DR2. Additionally, the second sensing portion 202*bx*32, the third magnet 202*bx*6, and the plurality of coils 202*bx*21 and 202*bx*22 of the first lens driver 202*bx* may also sense a position change of the lens barrel in a direction parallel to the second direction DR2. In order to correct the position change, the plurality of coils 202*bx*21 and 202*bx*22 and the first magnet 202*bx*4 of the first lens driver 202*bx* may move the lens barrel in a direction parallel to the second direction DR2. The sensing portion 202*by*3, the second magnet 202*by*5, and the coil 202*by*2 of the second lens driver 202*by* may sense a position change of the lens barrel according to a direction parallel to first direction DR1. Additionally, in order to correct the position change, the coil 202*by*2 and the first magnet 202*by*4 of the second lens driver 202*by* may move the lens barrel in a direction parallel to the first direction DR1.

In an example, the substrate 202*bx*1 of the first lens driver 202*bx* and the substrate 202*by*1 of the second lens driver 202*by* may be one substrate connected to each other.

As described with reference to FIG. 1 and FIG. 2, the focus adjusting driver 201 may generate a driving force to move the lens barrel 120 in the optical axis direction, for example, in the third direction DR3, and the shake correcting driver 202 may generate a driving force to move the lens barrel 120 in the first and second directions DR1 and DR2 perpendicular to the third direction DR3.

The first lens driver 202*bx* and the second lens driver 202*by* of the lens driver 202*b* may be the shake correcting driver 202, and when a shaking error occurs in the camera module, they may move the lens barrel 120 in the first and second directions DR1 and DR2 perpendicular to the third direction DR3 to correct movement caused by hand shaking.

In an example, the first sensing portion 202*bx*31 and the second sensing portion 202*bx*32 of the first lens driver 202*bx* may collect sensor information according to the movement of the lens barrel 120 in the second direction DR2. The sensing portion 202*by*3 of the second lens driver 202*by* may collect sensor information according to the movement of the lens barrel 120 in the first direction DR1. The first sensing portion 202*bx*31 and the second sensing portion 202*bx*32 of the first lens driver 202*bx* and the sensing portion 202*by*3 of the second lens driver 202*by* may be electrically connected to the printed circuit board 163. Additionally, the first sensing portion 202*bx*31 and the second sensing portion 202*bx*32 of the first lens driver 202*bx*, and the sensing portion 202*by*3 of the second lens driver 202*by*, may transmit the collected sensor information to a first processor (for example, a control circuit) of the camera module 100 through the printed circuit board 163 or a second processor of the electronic device on which the camera module 100 is mounted. The printed circuit board 163 may be connected to the first processor (or the control circuit) related to driving the camera module 100 or the second processor of the electronic device on which the camera module 100 is mounted.

According to the control of at least one of the first processor and the second processor, the printed circuit board 163 may supply a signal of a specified magnitude (for example: a current of a specified magnitude) to at least one of the plurality of coils 202*bx*21 and 202*bx*22 and the coil 202*by*. Accordingly, rotation occurring in the lens module 120 may be compensated to prevent deterioration of image quality of the camera module 100. As a specific example, at least one of the plurality of coils 202*bx*21 and 202*bx*22 may be controlled so that a sum of a value of the sensor information according to the movement of the lens barrel 120 in the second direction DR2 collected by the first sensing portion 202*bx*31 of the first lens driver 202*bx*, and a value of the sensor information according to the movement of the lens barrel 120 in the second direction DR2 collected by the second sensing portion 202*bx*32 of the first lens driver 202*bx* becomes zero. In this example, processing such as, but not limited to, linear regression may be performed on the sensor information.

Figure 5:
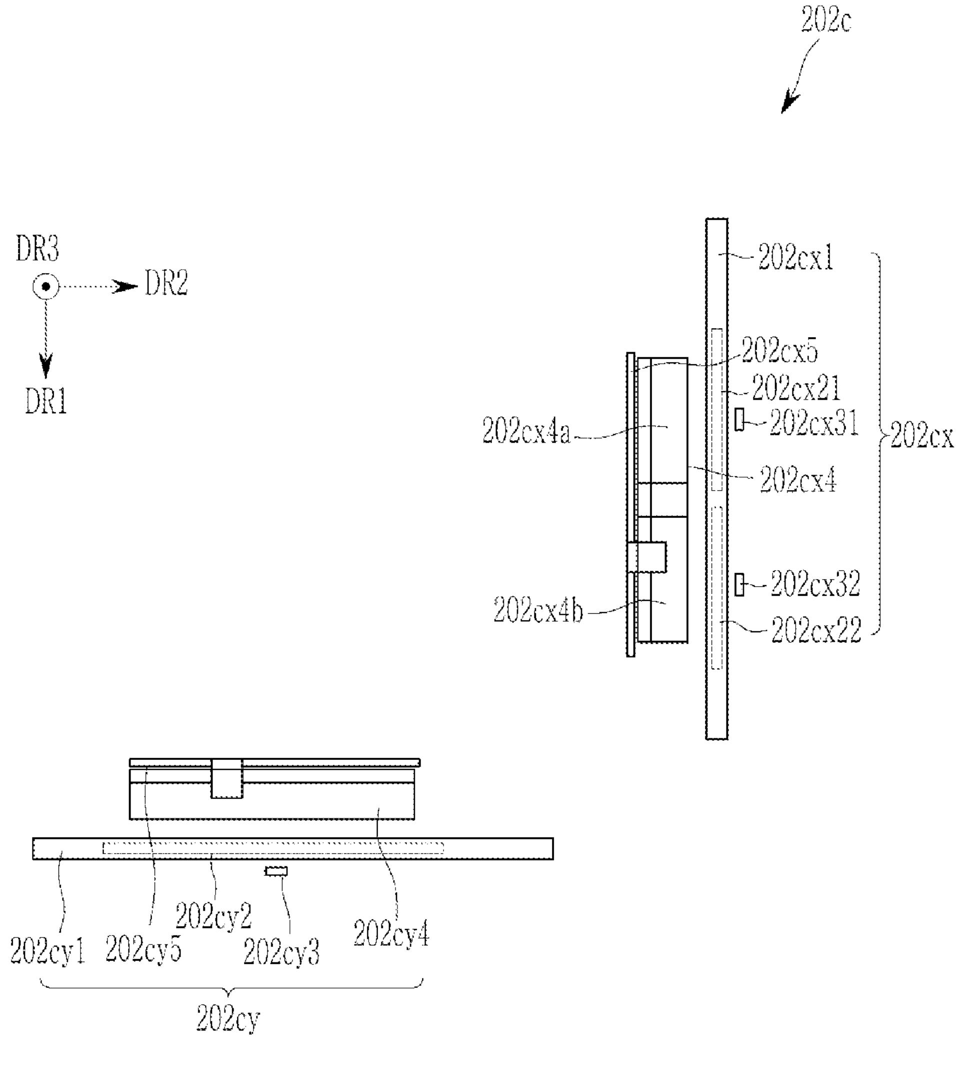
FIG. 5 illustrates a top plan view of an example lens driver, in accordance with one or more embodiments.

Hereinafter, a lens driver, in accordance with one or more embodiments, will be described with reference to FIG. 5. FIG. 5 illustrates a top plan view of an example lens driver, in accordance with one or more embodiments.

Referring to FIG. 5, an example lens driver 202*c*, in accordance with one or more embodiments, may include a first lens driver 202*cx* extending in parallel to the first direction DR1 and a second lens driver 202*cy* extending in parallel to the second direction DR2 different from the first direction DR1.

The first lens driver 202*cx* may include a substrate 202*cx*1, a plurality of coils 202*cx*21 and 202*cx*22, a first sensing portion 202*cx*31, a second sensing portion 202*cx*32, a magnet 202*cx*4, and a yoke 202*cx*5.

The plurality of coils 202*cx*21 and 202*cx*22 of the first lens driver 202*cx* may be formed in the substrate 202*cx*1. In an example, the plurality of coils 202*cx*21 and 202*cx*22 may be winding coils or fine pattern (FP) coils embedded in the substrate 202*cx*1. The FP coil may have an integrally formed pattern on the substrate. Additionally, the FP coil may be formed in a plate shape, so it may be easily attached to the housing 110.

The first sensing portion 202*cx*31 and the second sensing portion 202*cx*32 may include a sensor such as a Hall sensor, and may be disposed outside the plurality of coils 202*cx*21 and 202*cx*22 on the substrate 202*cx*1. The first sensing portion 202*cx*31 and the second sensing portion 202*cx*32 may not overlap the plurality of coils 202*cx*21 and 202*cx*22 along the first direction DR1 and the third direction DR3 in which the substrate 202*cx*1 extends. Additionally, each of the first sensing portion 202*cx*31 and the second sensing portion 202*cx*32 may overlap at least one of the plurality of coils 202*cx*21 and 202*cx*22 along the second direction DR2. The second direction DR2 is perpendicular to the first direction DR1 and the third direction DR3, and may be a direction in which the substrate 202*cx*1 and the magnet 202*cx*4 face each other. The first sensing portion 202*cx*31 may be disposed to face at least one of the plurality of coils 202*cx*21 and 202*cx*22. The second sensing portion 202*cx*32 may be disposed to face at least one of the plurality of coils 202*cx*21 and 202*cx*22.

The magnet 202*cx*4 of the first lens driver 202*cx* may be disposed to overlap the plurality of coils 202*cx*21 and 202*cx*22, the first sensing portion 202*cx*31, and the second sensing portion 202*cx*32 along the second direction DR2. The magnet 202*cx*4 may include a first magnet portion 202*cx*4*a* and a second magnet portion 202*cx*4*b* respectively facing at least one of the plurality of coils 202*cx*21 and 202*cx*22. The first magnet portion 202*cx*4*a* and the second magnet portion 202*cx*4*b* of the magnet 202Cx4 may have different magnetic poles along the first direction DR1.

The yoke 202*cx*5 may be disposed on a rear surface of the magnet 202*cx*4. The yoke 202*cx*5 may be flat along the first direction DR1. The yoke 202*cx*5 may include a protrusion overlapping the magnet 202*cx*4 along the third direction DR3.

Along the second direction DR2, the first sensing portion 202*cx*31 may be disposed on a surface opposite to one surface of the substrate 202*cx*1 on which the substrate 202*cx*1 and the magnet 202*cx*4 face each other. Thus, a space in which the first sensing portion 202*cx*31 may be disposed may be secured. The second sensing portion 202*cx*32 may be disposed on a surface opposite to one surface of the substrate 202*cx*1 on which the substrate 202*cx*1 and the magnet 202*cx*4 face each other. Thus, a space in which the second sensing portion 202*cx*32 may be disposed may be secured. Additionally, by forming the plurality of coils 202*cx*21 and 202*cx*22 of the lens driver in the substrate 202*cx*1, the lens driver may have a thin form factor.

Similar to the first lens driver 202*cx*, the second lens driver 202*cy* may include a substrate 202*cy*1, a coil 202*cy*2, a sensing portion 202*cy*3, a magnet 202*cy*4, and a yoke 202*cy*5.

The coil 202*cy*2 of the second lens driver 202*cy* may be a winding coil embedded in the substrate 202*cy*1 or a fine pattern (FP) coil. The FP coil may have an integrally formed pattern on the substrate. Additionally, the FP coil may be formed in a plate shape, so it may be easily attached to the housing 110.

The sensing portion 202*cy*3 may include a sensor such as, but not limited to, a Hall sensor, and may be disposed outside the coil 202*cy*2 on the substrate 202*cy*1. In an example, the sensing portion 202*cy*3 may not overlap the coil 202*cy*2 along the first direction DR1 and the third direction DR3 in which the substrate 202*cy*1 extends. Additionally, the sensing portion 202*cy*3 may overlap the coil 202*cy*2 along the second direction DR2. The second direction DR2 is perpendicular to the first direction DR1 and the third direction DR3, and may be a direction in which the substrate 202*cy*1 and the magnet 202*cy*4 face each other.

The magnet 202*cy*4 of the second lens driver 202*cy* may face the coil 202*cy*2 along the first direction DR1.

The yoke 202*cy*5 may be disposed on a rear surface of the magnet 202*cy*4. The yoke 202*cy*5 may be flat along the second direction DR2.

Along the second direction DR2, the sensing portion 202*cy*3 may be disposed on a surface opposite to one surface of the substrate 202*cy*1 on which the substrate 202*cy*1 and the magnet 202*cy*4 face each other. Thus, a space in which the sensing portion 202*cy*3 may be disposed may be secured. Additionally, by forming the coil 202*cy*2 of the lens driver in the substrate 202*cy*1, the lens driver may be implemented with a thin form factor.

The first sensing portion 202*cx*31, the magnet 202*cx*4, and the coil 202*cx*21 facing the first sensing portion 202*cx*31 among the plurality of coils 202*cx*21 and 202*cx*22 of the first lens driver 202*cx* may sense a position change of the lens barrel in a direction parallel to the second direction DR2. Additionally, the second sensing portion 202*cx*32, the magnet 202*cx*4, and the coil 202*cx*22 facing the second sensing portion 202*cx*32 among the plurality of coils 202*cx*21 and 202*cx*22 of the first lens driver 202*cx* may also sense a position change of the lens barrel in a direction parallel to the second direction DR2. Additionally, in order to correct the position change, the plurality of coils 202*cx*21 and 202*cx*22 and the magnet 202*cx*4 of the first lens driver 202*cx* may move the lens barrel in a direction parallel to the second direction DR2. The sensing portion 202*cy*3, the magnet 202*cy*4, and the coil 202*cy*2 of the second lens driver 202*cy* may sense a position change of the lens barrel according to a direction parallel to first direction DR1. Additionally, in order to correct the position change, the coil 202*cy*2 and the magnet 202*cy*4 of the second lens driver 202*cy* may move the lens barrel in a direction parallel to the first direction DR1.

In an example, the substrate 202*cx*1 of the first lens driver 202*cx* and the substrate 202*cy*1 of the second lens driver 202*cy* may be one substrate connected to each other.

As described with reference to FIG. 1 and FIG. 2, the focus adjusting driver 201 may generate a driving force to move the lens barrel 120 in the optical axis direction, for example, in the third direction DR3, and the shake correcting driver 202 may generate a driving force to move the lens barrel 120 in the first and second directions DR1 and DR2 perpendicular to the third direction DR3.

The first lens driver 202*cx* and the second lens driver 202*cy* of the lens driver 202*c* may be the shake correcting driver 202, and when a shaking error occurs in the camera module, they may move the lens barrel 120 in the first and second directions DR1 and DR2 perpendicular to the third direction DR3 to correct movement caused by shaking.

In an example, the first sensing portion 202*cx*31 and the second sensing portion 202*cx*32 of the first lens driver 202*cx* may collect sensor information according to the movement of the lens barrel 120 in the second direction DR2. The sensing portion 202*cy*3 of the second lens driver 202*cy* may collect sensor information according to the movement of the lens barrel 120 in the first direction DR1. The first sensing portion 202*cx*31 and the second sensing portion 202*cx*32 of the first lens driver 202*cx* and the sensing portion 202*cy*3 of the second lens driver 202*cy* may be electrically connected to the printed circuit board 163. Additionally, the first sensing portion 202*cx*31 and the second sensing portion 202*cx*32 of the first lens driver 202*cx* and the sensing portion 202*cy*3 of the second lens driver 202*cy* may transmit the collected sensor information to a first processor (for example, a control circuit) of the camera module 100 through the printed circuit board 163 or a second processor of the electronic device on which the camera module 100 is mounted. The printed circuit board 163 may be connected to the first processor (or the control circuit) related to driving the camera module 100 or the second processor of the electronic device on which the camera module 100 is mounted.

According to the control of at least one of the first processor and the second processor, the printed circuit board 163 may supply a signal of a specified magnitude (for example: a current of a specified magnitude) to at least one of the plurality of coils 202*cx*21 and 202*cx*22 and the coil 202*cy*. Accordingly, rotation occurring in the lens module 120 may be compensated to prevent deterioration of image quality of the camera module 100. As a specific example, at least one of the plurality of coils 202*cx*21 and 202*cx*22 may be controlled so that a sum of a value of the sensor information according to the movement of the lens barrel 120 in the second direction DR2 collected by the first sensing portion 202*cx*31 of the first lens driver 202*cx* and a value of the sensor information according to the movement of the lens barrel 120 in the second direction DR2 collected by the second sensing portion 202*cx*32 of the first lens driver 202*cx* becomes zero. In this example, processing such as linear regression may be performed on the sensor information.

Figure 6:
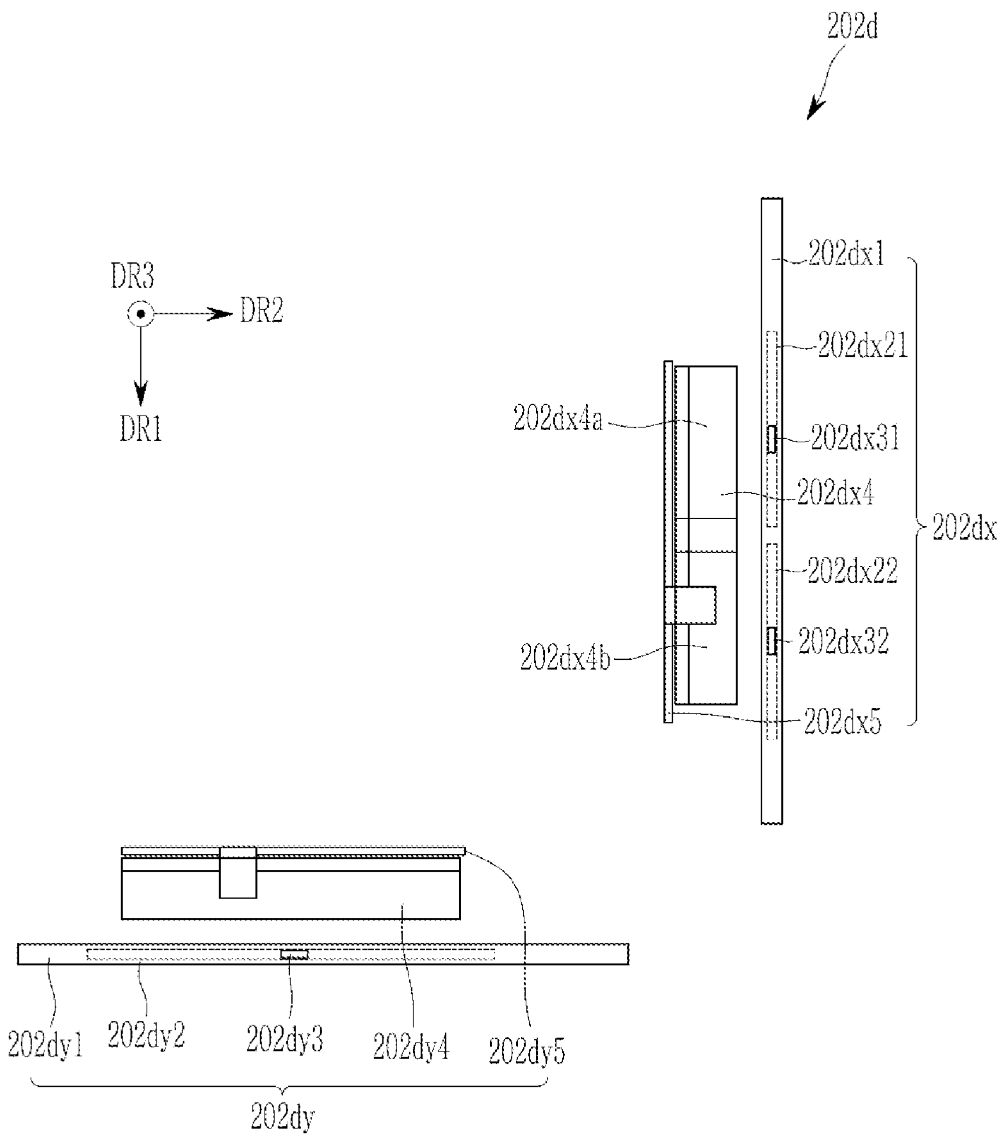
FIG. 6 illustrates a top plan view of an example lens driver, in accordance with one or more embodiments.

Hereinafter, an example lens driver, in accordance with one or more embodiments, will be described with reference to FIG. 6. FIG. 6 illustrates a top plan view of an example lens driver, in accordance with one or more embodiments.

Referring to FIG. 6, a lens driver 202*d*, in accordance with one or more embodiments, may include a first lens driver 202*dx*, extending in parallel to the first direction DR1, and a second lens driver 202*dy*, extending in parallel to the second direction DR2 different from the first direction DR1.

The first lens driver 202*dx* may include a substrate 202*dx*1, a plurality of coils 202*dx*21 and 202*dx*22, a first sensing portion 202*dx*31, a second sensing portion 202*dx*32, a magnet 202*dx*4, and a yoke 202*dx*5.

The plurality of coils 202*dx*21 and 202*dx*22 of the first lens driver 202*dx* may be formed in the substrate 202*dx*1. In an example, the plurality of coils 202*dx*21 and 202*dx*22 may be winding coils or fine pattern (FP) coils embedded in the substrate 202*dx*1. The FP coil may have an integrally formed pattern on the substrate. Additionally, the FP coil may be formed in a plate shape, so it may be easily attached to the housing 110.

The first sensing portion 202*dx*31 and the second sensing portion 202*dx*32 may include a sensor such as, but not limited to, a Hall sensor, and may be disposed outside the plurality of coils 202*dx*21 and 202*dx*22 on the substrate 202*dx*1. The first sensing portion 202*dx*31 and the second sensing portion 202*dx*32 may overlap at least one of the plurality of coils 202*dx*21 and 202*dx*22 along the first direction DR1 and the third direction DR3 in which the substrate 202*dx*1 extends. Additionally, each of the first sensing portion 202*dx*31 and the second sensing portion 202*dx*32 may overlap at least one of the plurality of coils 202*dx*21 and 202*dx*22 along the second direction DR2. The second direction DR2 is perpendicular to the first direction DR1 and the third direction DR3, and may be a direction in which the substrate 202*dx*1 and the magnet 202*dx*4 face each other.

The magnet 202*dx*4 of the first lens driver 202*dx* may be disposed to face the plurality of coils 202*dx*21 and 202*dx*22, the first sensing portion 202*dx*31, and the second sensing portion 202*dy*32 along the second direction DR2. The magnet 202*dx*4 may include a first magnet portion 202*dx*4*a* and a second magnet portion 202*dx*4*b* respectively facing at least one of the plurality of coils 202*dx*21 and 202*dx*22. The first magnet portion 202*dx*4*a* and the second magnet portion 202*dx*4*b* may have different magnetic poles along the first direction DR1.

The yoke 202*dx*5 may be disposed on a rear surface of the magnet 202*dx*4. The yoke 202*dx*5 may be flat along the first direction DR1. The yoke 202*dx*5 may include a protrusion overlapping the magnet 202*dx*4 along the third direction DR3.

Along the second direction DR2, the first sensing portion 202*dx*31 may be disposed inside the coil 202*dx*21 overlapping the first sensing portion among the plurality of coils 202*dx*21 and 202*dx*22, and may be embedded inside the substrate 202*dx*1. Thus, a space in which the first sensing portion 202*dx*31 may be disposed may be secured. The second sensing portion 202*dx*32 may be disposed inside the coil 202*dx*22 overlapping the second sensing portion among the plurality of coils 202*dx*21 and 202*dx*22, and may be embedded inside the substrate 202*dx*1. Thus, a space in which the second sensing portion 202*dx*32 may be disposed may be secured. Additionally, by forming the plurality of coils 202*dx*21 and 202*dx*22 of the lens driver in the substrate 202*dx*1, the lens driver may be implemented with a thin form factor.

Similar to the first lens driver 202*dx*, the second lens driver 202*dy* may include a substrate 202*dy*1, a coil 202*dy*2, a sensing portion 202*dy*3, a magnet 202*dy*4, and a yoke 202*dy*5.

The coil 202*dy*2 of the second lens driver 202*dy* may be a winding coil embedded in the substrate 202*dy*1 or a fine pattern (FP) coil. The FP coil may have an integrally formed pattern on the substrate. Additionally, the FP coil may be formed in a plate shape, so it may be easily attached to the housing 110.

The sensing portion 202*dy*3 may include a sensor such as, but not limited to, a Hall sensor, and may be disposed outside the coil 202*dy*2 on the substrate 202*dy*1. The sensing portion 202*dy*3 may overlap the coil 202*dy*2 along the first direction DR1 and the third direction DR3 in which the substrate 202*dy*1 extends. Additionally, the sensing portion 202*dy*3 may overlap the coil 202*dy*2 along the second direction DR2. The second direction DR2 is perpendicular to the first direction DR1 and the third direction DR3, and may be a direction in which the substrate 202*dy*1 and the magnet 202*dy*4 face each other.

The magnet 202*dy*4 of the second lens driver 202*dy* may be disposed to face the coil 202*dy*2 and the sensing portion 202*dy*3 along the first direction DR1.

The yoke 202*dy*5 may be disposed on a rear surface of the magnet 202*dy*4. The yoke 202*dy*5 may be flat along the second direction DR2.

Along the second direction DR2, the sensing portion 202*dy*3 may be disposed inside the coil 202*dy*2 and embedded inside the substrate 202*dx*1. Thus, a space in which the second sensing portion 202*dx*32 may be disposed may be secured. Additionally, by forming the coil 202*dy*2 of the lens driver in the substrate 202*dy*1, the lens driver may be implemented with a thin form factor.

The first sensing portion 202*dx*31, the magnet 202*dx*4, and the coil 202*dx*21 facing the first sensing portion 202*dx*31 among the plurality of coils 202*dx*21 and 202*dx*22 of the first lens driver 202*dx* may sense a change in the position of the lens barrel in a direction parallel to the second direction DR2. Additionally, the second sensing portion 202*dx*32, the magnet 202*dx*4, and the coil 202*dx*22 facing the second sensing portion 202*dx*32 among the plurality of coils 202*dx*21 and 202*dx*22 of the first lens driver 202*dx* may also sense a change in the position of the lens barrel in a direction parallel to the second direction DR2. Additionally, in order to correct the position change, the plurality of coils 202*dx*21 and 202*dx*22 and the magnet 202*dx*4 of the first lens driver 202*dx* may move the lens barrel in a direction parallel to the second direction DR2. The sensing portion 202*dy*3, the magnet 202*dy*4, and the coil 202*dy*2 of the second lens driver 202*dy* may sense a position change of the lens barrel according to a direction parallel to first direction DR1. Additionally, in order to correct the position change, the coil 202*dy*2 and the magnet 202*dy*4 of the second lens driver 202*dy* may move the lens barrel in a direction parallel to the first direction DR1.

In an example, the substrate 202*dx*1 of the first lens driver 202*dx* and the substrate 202*dy*1 of the second lens driver 202*dy* may be one substrate connected to each other.

As described with reference to FIG. 1 and FIG. 2, the focus adjusting driver 201 may generate a driving force to move the lens barrel 120 in the optical axis direction, for example, in the third direction DR3, and the shake correcting driver 202 may generate a driving force to move the lens barrel 120 in the first and second directions DR1 and DR2 perpendicular to the third direction DR3.

The first lens driver 202*dx* and the second lens driver 202*dy* of the lens driver 202*d* may be the shake correcting driver 202, and when a shaking error occurs in the camera module, they may move the lens barrel 120 in the first and second directions DR1 and DR2 perpendicular to the third direction DR3 to correct movement caused by shaking.

In an example, the first sensing portion 202*dx*31 and the second sensing portion 202*dx*32 of the first lens driver 202*dx* may collect sensor information according to the movement of the lens barrel 120 in the second direction DR2. The sensing portion 202*dy*3 of the second lens driver 202*dy* may collect sensor information according to the movement of the lens barrel 120 in the first direction DR1. The first sensing portion 202*dx*31 and the second sensing portion 202*dx*32 of the first lens driver 202*dx* and the sensing portion 202*dy*3 of the second lens driver 202*dy* may be electrically connected to the printed circuit board 163. Additionally, the first sensing portion 202*dx*31 and the second sensing portion 202*dx*32 of the first lens driver 202*dx* and the sensing portion 202*dy*3 of the second lens driver 202*dy* may transmit the collected sensor information to a first processor (for example, a control circuit) of the camera module 100 through the printed circuit board 163 or a second processor of the electronic device on which the camera module 100 is mounted. The printed circuit board 163 may be connected to the first processor (or the control circuit) related to driving the camera module 100 or the second processor of the electronic device on which the camera module 100 is mounted.

According to the control of at least one of the first processor and the second processor, the printed circuit board 163 may supply a signal of a specified magnitude (for example: a current of a specified magnitude) to at least one of the plurality of coils 202*dx*21 and 202*dx*22 and the coil 202*dy*2. Accordingly, rotation occurring in the lens module 120 may be compensated to prevent deterioration of image quality of the camera module 100. As a specific example, at least one of the plurality of coils 202*dx*21 and 202*dx*22 may be controlled so that a sum of a value of the sensor information according to the movement of the lens barrel 120 in the second direction DR2 collected by the first sensing portion 202*dx*31 of the first lens driver 202*dx* and a value of the sensor information according to the movement of the lens barrel 120 in the second direction DR2 collected by the second sensing portion 202*dx*32 of the first lens driver 202*dx* becomes zero. In this example, processing such as linear regression may be performed on the sensor information.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A lens driver, comprising a plurality of first coils disposed on a first substrate that extends in a first direction, a second coil disposed on a second substrate that extends in a second direction different from the first direction, a first sensing portion disposed on the first substrate, and disposed external to the plurality of first coils so as to not overlap the plurality of first coils along the second direction, a first magnet including a first magnet portion and a second magnet portion that are respectively disposed to face at least one of the plurality of first coils along the second direction, and configured to have different magnetic poles along the first direction, a second magnet disposed to face the first sensing portion along the second direction, a third sensing portion disposed on the first substrate and disposed external to the plurality of first coils so as to not overlap the plurality of first coils along the second direction, and a fifth magnet disposed to face the third sensing portion along the second direction, wherein a second distance between the first substrate and the second magnet along the second direction is greater than a first distance between the first substrate and the first magnet along the second direction.

2. The lens driver of claim 1, wherein:

the first sensing portion is disposed between the first substrate and the second magnet.

3. The lens driver of claim 1, wherein:

a thickness of the first magnet along the second direction is different from a thickness of the second magnet along the second direction.

4. The lens driver of claim 1, wherein:

the plurality of first coils are fine pattern (FP) coils which have a pattern integrally formed on the first substrate.

5. The lens driver of claim 1, further comprising:

a second sensing portion disposed on the second substrate and disposed external to the second coil so as to not overlap the second coil along the first direction, a third magnet disposed to face the second coil along the first direction, and a fourth magnet disposed to face the second sensing portion along the first direction, wherein a fourth distance between the second substrate and the fourth magnet along the first direction is greater than a third distance between the second substrate and the third magnet along the first direction.

6. The lens driver of claim 5, wherein:

the second sensing portion is disposed between the second substrate and the fourth magnet.

7. The lens driver of claim 5, wherein:

a thickness of the third magnet along the first direction is different from a thickness of the fourth magnet along the first direction.

8. The lens driver of claim 1, wherein:

the second coil is a fine pattern (FP) coil which has a pattern integrally formed on the second substrate.

9. The lens driver of claim 1, further comprising:

a first yoke disposed on a rear surface of the first magnet, and a second yoke disposed on a rear surface of the second magnet, wherein the first yoke includes a protrusion that overlaps the first magnet along a third direction perpendicular to the first direction and the second direction, and wherein the second yoke includes a protrusion that overlaps the second magnet along the third direction.

10. The lens driver of claim 1, wherein a third distance between the first substrate and the fifth magnet along the second direction is greater than the first distance between the first substrate and the first magnet.

11. The lens driver of claim 10, wherein:

the third sensing portion is disposed between the first substrate and the fifth magnet.

12. The lens driver of claim 10, wherein:

a thickness of the first magnet along the second direction is different from a thickness of the fifth magnet along the second direction.

13. The lens driver of claim 10, further comprising:

a third yoke disposed on a rear surface of the fifth magnet, wherein the third yoke includes a protrusion that overlaps the fifth magnet along the third direction perpendicular to the first direction and the second direction.

14. The lens driver of claim 10, further comprising:

a first connection member configured to connect the first magnet and the second magnet, and a second connection member configured to connect the first magnet and the fifth magnet.

15. The lens driver of claim 14, wherein:

the first connection member and the second connection member are respectively disposed at a first end of the first magnet and a second end of the first magnet along the first direction.

16. A lens driver comprising:

a plurality of first coils disposed on a first substrate that extends in a first direction, a second coil disposed on a second substrate that extends in a second direction different from the first direction, a plurality of first sensing portions disposed to respectively overlap the plurality of first coils of the first substrate along the second direction, a second sensing portion disposed to overlap the second coil of the second substrate along the first direction, a first magnet including a first magnet portion and a second magnet portion that are respectively disposed to face at least one of the plurality of first coils along the second direction, and configured to have different magnetic poles along the first direction, a second magnet disposed to face the second coil along the first direction, a third sensing portion disposed on the first substrate and disposed external to the plurality of first coils so as to not overlap the plurality of first coils along the second direction, and a third magnet disposed to face the third sensing portion along the second direction, wherein the plurality of first coils and the second coil are fine pattern (FP) coils which have a pattern integrally formed on a substrate.

17. The lens driver of claim 16, wherein:

each of the plurality of first sensing portions is disposed inside the plurality of first coils.

18. The lens driver of claim 16, wherein:

the plurality of first sensing portions are embedded inside the first substrate.

19. The lens driver of claim 16, wherein:

the first magnet is disposed to overlap the plurality of first coils and the plurality of first sensing portions along the second direction.

20. The lens driver of claim 16, further comprising:

a first yoke disposed on a rear surface of the first magnet, and a second yoke disposed on a rear surface of the second magnet, wherein the first yoke includes a protrusion that overlaps the first magnet along a third direction perpendicular to the first and second directions, and wherein the second yoke includes a protrusion that overlaps the second magnet along the third direction.

* * * * *